(12) United States Patent
Yano (10) Patent No.: US 7,855,662 B2
(45) Date of Patent: Dec. 21, 2010

(54) SYSTEM FOR DETECTING OVER AXLE WEIGHT VEHICLE

(75) Inventor: Shinya Yano, Hyogo (JP)

(73) Assignee: Mitsubishi Heavy Industries, Ltd. (JP)

( * ) Notice: Subject to any disclaimer, the term of this patent is extended or adjusted under 35 U.S.C. 154(b) by 293 days.

(21) Appl. No.: 11/947,138

(22) Filed: Nov. 29, 2007

(65) Prior Publication Data

US 2008/0136676 A1   Jun. 12, 2008

(30) Foreign Application Priority Data

Dec. 1, 2006   (JP) .............................. 2006-326129

(51) Int. Cl.
*G08G 1/01* (2006.01)
(52) U.S. Cl. ..................... 340/933; 702/175; 177/136
(58) Field of Classification Search ................ 340/933; 702/173–175; 385/13; 177/136
See application file for complete search history.

(56) References Cited

U.S. PATENT DOCUMENTS

| | | | | |
|---|---|---|---|---|
| 5,621,195 A | * | 4/1997 | Taylor et al. ................. | 177/133 |
| 6,459,050 B1 | * | 10/2002 | Muhs et al. .................. | 702/175 |
| 6,681,195 B1 | * | 1/2004 | Poland et al. ................ | 702/149 |
| 7,024,064 B2 | * | 4/2006 | Hill et al. ..................... | 385/13 |
| 7,036,353 B2 | * | 5/2006 | Ketley ........................ | 73/23.33 |

FOREIGN PATENT DOCUMENTS

| | | |
|---|---|---|
| AU | 2003261528 | 5/2004 |
| JP | 9-243440 | 9/1997 |
| JP | 2000048297 | 2/2000 |
| JP | 2000149184 | 5/2000 |
| JP | 2003331384 | 11/2003 |
| KR | 0300347 | 1/2003 |

OTHER PUBLICATIONS

English Translation of Examiner's Opinion (3 Sheets).
Office Action issued on Jun. 4, 2009 in the corresponding Korean Patent Application No. 10-2007-123279.
Japanese Translation of Office Office in the corresponding Korean Patent Application No. 10-2007-123279.
International Search Report and Written Opinion from corresponding Singapore Patent Application No. 200718210-8.

* cited by examiner

*Primary Examiner*—John A Tweel, Jr.
(74) *Attorney, Agent, or Firm*—Kanesaka Berner & Partners, LLP (57) ABSTRACT

A technique for recording the front image of vehicles which violate the regulation in the axle weight is desired. In general, the weight of the leading axle cannot be excessively heavy, so that the over weight axle is a second or more rear side axle. Further, the distance between an axle weight detector and a vehicle detector for taking a vehicle image is normally below 8 meters. Under these conditions, when the over weight axle is detected, the over axle weight vehicle is predicted to be a vehicle being presently detected, a vehicle to be detected next, or next to the next. From the images of those vehicles, vehicles having no possibility of violating the axle weight regulation are eliminated based on a license plate read from the vehicle image or the measured vehicle height. The images not eliminated are stored as over axle weight vehicle images.

5 Claims, 11 Drawing Sheets

| EVENT NUMBER | VEHICLE ARRANGEMENT WHEN OVER WEIGHT IS DETECTED | S STATUS | TRUE OVER WEIGHT VEHICLE |
|---|---|---|---|
| (a) 1 | | | PRESENT S2 CROSSING VEHICLE |
| (b) 2-1 | | S_11 | |
| (c) 2-2 | | | NEXT S2 CROSSING VEHICLE |

Fig. 14

| EVENT NUMBER | VEHICLE ARRANGEMENT WHEN OVER WEIGHT IS DETECTED | S STATUS | TRUE OVER WEIGHT VEHICLE |
|---|---|---|---|
| (a) 3 | | S_10 | NEXT S2 CROSSING VEHICLE |
| (b) 4 | | | NEXT NEXT S2 CROSSING VEHICLE |

Fig. 15

| Event Number | | Vehicle Arrangement when Over Weight is Detected | S Status | True Over Weight Vehicle |
|---|---|---|---|---|
| (a) | 5-1 | | S_01 | NEXT S2 CROSSING VEHICLE |
| (b) | 5-2 | | | |

Fig. 16

| Event Number | Vehicle Arrangement when Over Weight is Detected | S Status | True Over Weight Vehicle |
|---|---|---|---|
| 6 | | S_00 | NEXT S2 CROSSING VEHICLE |

Fig. 17

| DISTANCE BETWEEN DETECTED AXLE AND S2 | S STATUS | EVENT NUMBER | OVER AXLE WEIGHT CANDIDATE VEHICLE | REMARKS |
|---|---|---|---|---|
| 1 ~ 3 METER | S_11 | 1 | PRESENT S2 CROSSING VEHICLE ONLY | |
| | S_10 | 3 | NEXT S2 CROSSING VEHICLE ONLY | |
| | S_01 | 5 | NEXT S2 CROSSING VEHICLE ONLY | |
| | S_00 | 6 | NEXT S2 CROSSING VEHICLE ONLY | |
| 3 ~ 5 METER | S_11 | 1 or 2 | PRESENT S2 CROSSING VEHICLE NEXT S2 CROSSING VEHICLE | JUDGE COMPREHENSIVELY (FROM PLATE, HEIGHT, ETC.). IF CANNOT BE JUDGED, BOTH CASES ARE SENT. |
| | S_10 | 3 | NEXT S2 CROSSING VEHICLE ONLY | |
| | S_01 | 5 | NEXT S2 CROSSING VEHICLE ONLY | |
| | S_00 | 6 | NEXT S2 CROSSING VEHICLE ONLY | |
| 5 ~ 8 METER | S_11 | 1 or 2 | PRESENT S2 CROSSING VEHICLE NEXT S2 CROSSING VEHICLE | JUDGE COMPREHENSIVELY (FROM PLATE, HEIGHT, ETC.). IF CANNOT BE JUDGED, BOTH CASES ARE SENT. |
| | S_10 | 3 or 4 | NEXT S2 CROSSING VEHICLE NEXT NEXT S2 CROSSING VEHICLE | |
| | S_01 | 5 | NEXT S2 CROSSING VEHICLE ONLY | |
| | S_00 | 6 | NEXT S2 CROSSING VEHICLE ONLY | |

SYSTEM FOR DETECTING OVER AXLE WEIGHT VEHICLE

RELATED APPLICATIONS

The present application is based on, and claims priority from, Japanese Application Number 2006-326129, filed Dec. 1, 2006, the disclosure of which is hereby incorporated by reference herein in its entirety.

BACKGROUND OF THE INVENTION

1. Field of the Invention

The present invention relates to a technique for detecting a vehicle that violates a restriction with regard to the weight.

2. Description of Related Art

On a highway and the like, the weight of a vehicle is regulated. In order to verify whether or not a vehicle obeys the regulation, an axle weight detecting apparatus (also referred to as the loading plate) for measuring a weight for each axle of the vehicle is installed on the way. It is desired to identify and record the over axle weight vehicle that does not obey the regulation with regard to an axle weight.

Figure 1:
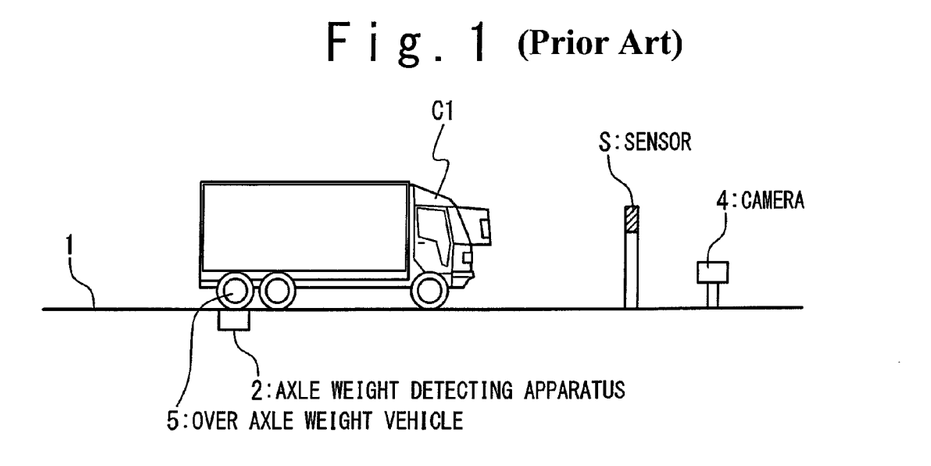
FIG. 1 shows an example of a related technique for identifying an over axle weight vehicle.

One example of the system for identifying and recording the over axle weight vehicle will be discussed below with reference to FIG. 1. This system is provided with: an axle weight detecting apparatus 2 installed on a lane 1 of a toll gate in a highway; a sensor S for detecting the vehicle at a predetermined position on a downstream side from the axle weight detecting apparatus 2; and a camera unit 4 installed on the downstream side from the sensor S.

The axle weight detecting apparatus 2 detects the axle weight and when the axle weight exceeds a predetermined maximum weight, generates an over axle weight signal and sends it to the camera unit 4 that is installed on the road side on the downstream side from the axle weight detecting apparatus 2.

The sensor S is a vehicle detecting apparatus that includes, for example, a pair of a phototransmitter and a photoreceiver. The sensor S detects the presence or absence of the vehicle at the detection position defined by the line determined to vertically intersect the traffic flow direction of the lane 1. When the light beam emitted by the phototransmitter is detected by the photoreceiver, the sensor S generates a signal of a vehicle flag F=0 indicating that the vehicle does not exist at the detection position to send the signal to the camera unit 4. When the light beam emitted by the phototransmitter is interrupted and is not detected by the photoreceiver, the sensor S generates a signal of a vehicle flag F=1 indicating that the vehicle exists at the detection position and sends the signal to the camera unit 4.

The camera unit 4 is installed on a downstream side that is separated by a predetermined distance from the detection position of the sensor S. The visual field of the camera in the camera unit 4 is oriented to the upstream side of the lane. The camera unit 4, when carrying out an image taking in synchronization with the timing when the head of the vehicle intersects the detection position, takes an image of the front of the vehicle.

The camera unit 4 is set at an over axle weight vehicle image storing mode when it receives the over axle weight signal from the axle weight detecting apparatus 2. The camera unit 4 gets the vehicle flag F from the sensor S. In the case of the vehicle flag F=1 which is received at the over axle weight vehicle image storing mode, the camera unit 4 automatically takes an image and then stores the image as an over axle weight vehicle image. With this operation, the image of the vehicle that firstly arrives as the detection position of the sensor S after the occurrence of the violation of the axle weight regulation, or the vehicle that exists at the detection position when the violation of the axle weight regulation occurred is stored as the over axle weight vehicle image.

SUMMARY

Figure 2:
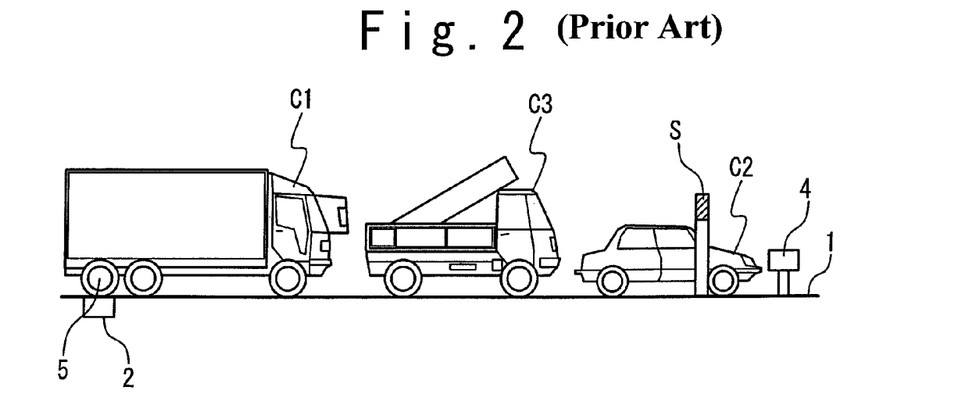
FIG. 2 shows an example of a related technique for identifying an over axle weight vehicle.

However, there was a case that the system of the above mentioned type could not take the front image of the over axle weight vehicle. FIG. 2 shows an example of such a case. Let us suppose that an over weight axle 5 of a vehicle C1 exceeds the maximum axle weight determined by a regulation. When the axle weight detecting apparatus 2 detects the over weight axle 5 and sends the over axle weight signal to the camera unit 4, the camera unit 4 is set at the over axle weight vehicle image storing mode. At this time, there is a situation wherein a different vehicle may exist in a region between the vehicle C1 and the sensor S. In the example of FIG. 2, there are two vehicles C2, C3. In such a case, the camera unit 4 gets the vehicle flag F=1 and carries out an image taking. Then, an image of the vehicle C2 that is not the over axle weight vehicle C1 is taken and stored as the over axle weight vehicle image. With such a situation, there was a case that a standard-sized vehicle without any possibility of the violation of the axle weight regulation is recorded as an over axle weight vehicle, and the front of the large-size vehicle, which is suspected of the violation of the axle weight regulation, is behind the standard-sized vehicle, or the front of the large-size vehicle is out of the field of the camera 4, so that the image of the over axle weight vehicle is not stored.

Japanese Laid Open Patent Application (JP-A-Heisei, 9-243440) discloses an imaging apparatus that prevents a standard-sized vehicle from being imaged as the over axle weight vehicle. This imaging apparatus detects the over axle weight vehicle by using a detection beam that intersects a lane so that a constant height is kept at a high position at which a small size vehicle does not block, from the viewpoint that most of the over axle weight vehicles are the large vehicles and not the smaller ones. With this technique, it is possible to take an image of the over axle weight vehicle without wrongly taking an image of the vehicle that is low in height and not the large vehicle. However, as illustrated in the vehicle C3 of FIG. 2, there is a case that an image of a standard-sized vehicle in which the possibility of the violation of the axle weight regulation is low is taken, for example, because of luggage is loaded on the roof to the degree that it blocks the detection beam at the high position.

Figure 3:
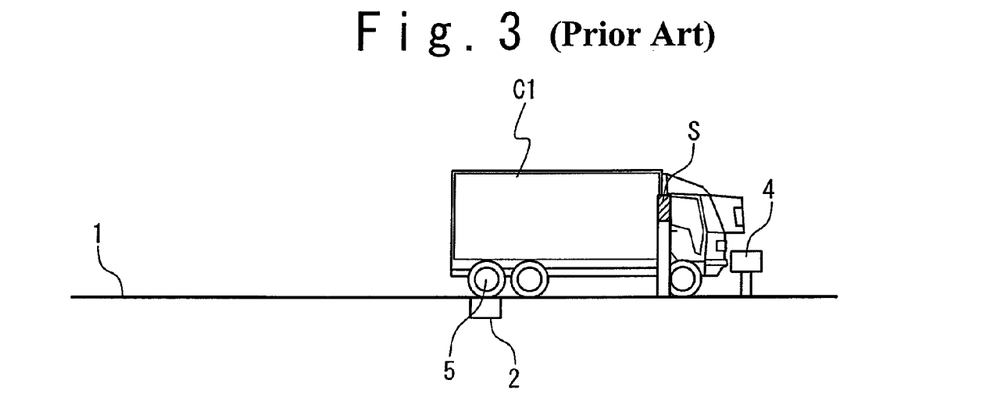
FIG. 3 shows an example of a related technique for identifying an over axle weight vehicle.

FIG. 3 shows another example in which a front image of the over axle weight vehicle cannot be taken. When the distance between the axle weight detecting apparatus 2 and the sensor S is short, if the rear axle of a vehicle C1 having large length is the over weight axle 5, there is a possibility that the head of the vehicle C1 is already ahead of the detection position of the sensor S when the axle weight detecting apparatus 2 detects the over weight axle 5. In such a case, the camera unit 4 takes an image of the side of the vehicle. For specifying the over axle weight vehicle, an image taken from the front of the vehicle is desired, rather than the side of the vehicle.

The relative positions of the axle weight detecting apparatus 2 and the camera unit 4 are different depending on the geometrical and civil engineering circumstances of the toll gate in which this system is installed. Thus, the pattern in which the situation shown in FIGS. 2, 3 occurs is different for each toll gate. Hence, it is difficult to record the front image of the over axle weight vehicle with a high probability independently of the toll gate.

A technique that makes it possible to record a front side image of an over axle weight vehicle at the higher probability is desired.

According to an aspect of the present invention, an over axle weight vehicle detecting system includes: an axle weight detecting section configured to detect a weight of an axle of a vehicle at a first position on a lane; a sensor configured to detect a vehicle at a second position set within 8 meters downstream side of the first position to generate a detection signal; a camera unit configured to take an image of a vehicle in response to the detection signal; and an over axle weight vehicle candidate extracting section configured to choose a vehicle detected by the sensor at the first position and a vehicle detected by the sensor at the second position as candidates for an over axle weight vehicle violating an axle weight regulation when the axle weight exceeds a predetermined value.

According to the present invention, a technique is provided that make it possible to record a front side image of the over axle weight vehicle with a high probability.

DETAILED DESCRIPTION OF PREFERRED EMBODIMENTS

Embodiments of the present invention will be described below with reference to the accompanying drawings.

The inventor of the present invention found out that the number of the vehicles existing between an axle weight detecting apparatus 2 and a sensor S could be determined in accordance with the actual properties of toll gates and vehicles. The ground of the determination will be described below with reference to FIG. 4.

Figure 4:
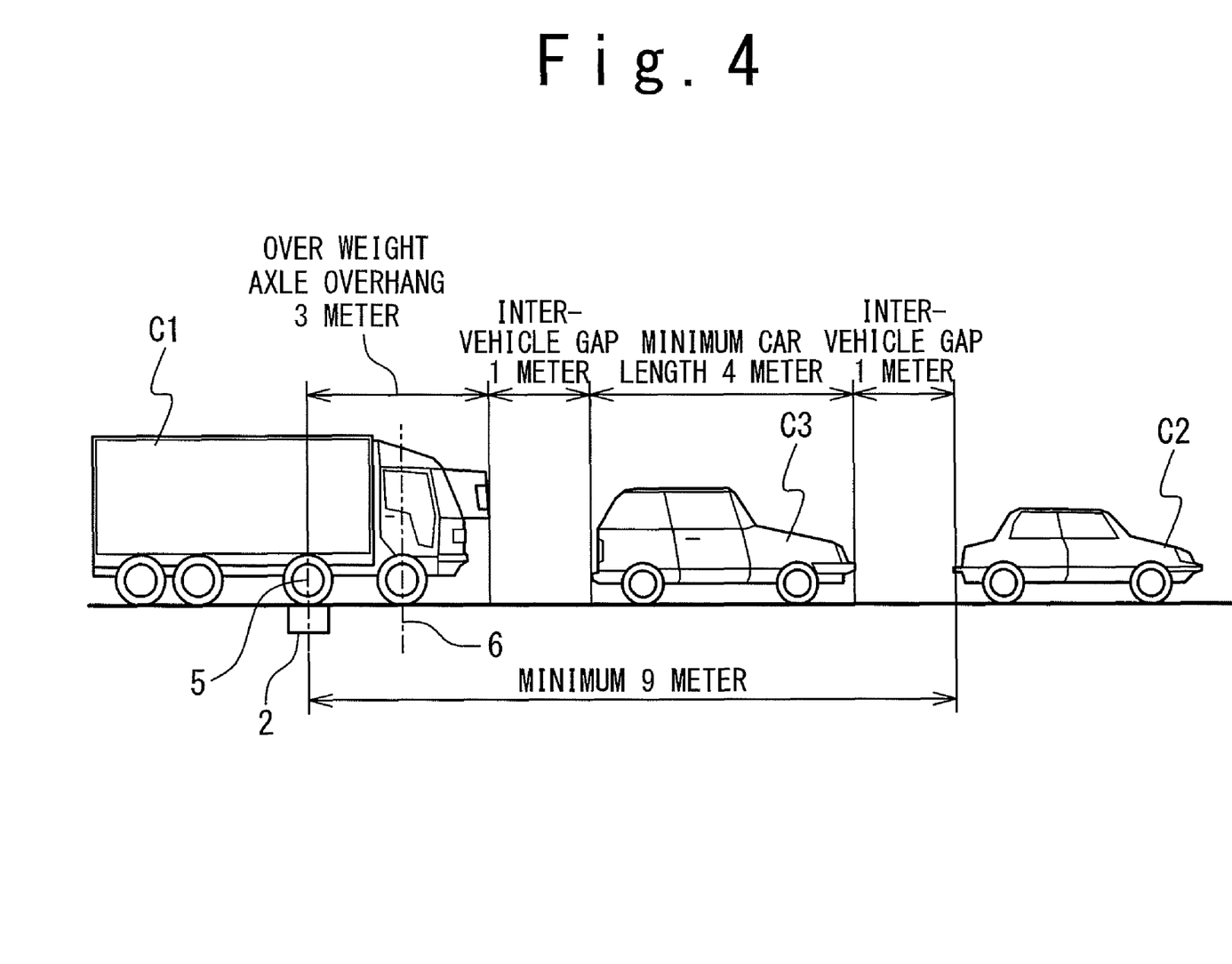
FIG. 4 is a view explaining a number of vehicles that can exist between an axle weight detecting apparatus and a sensor.

(A) Even in the case of the large-sized vehicle having a possibility of the violation of the axle weight regulation, the leading axle (the axle arranged closest to the head of the vehicle) does not violates the axle weight regulation. The legally allowed axle weight for the highway is 10 tons. However, if the leading axle weight exceeds this value, the steering becomes difficult because of the dynamic behavior of the vehicle. Thus, exceeding this value is actually impossible. Hence, the weight exceeding axle is considered to be the axle on and after the second axle from the front.

(B) The overhang of the axle on and after the second axle from the head (the distance between the axle and the head of the vehicle) is typically 3 meters or more.

(C) The inter-vehicle distance is considered to be about 1 meter.

(D) The length of the vehicle is a minimum of about 4 meter (in the case of a small vehicle).

(E) Usually, the distance between the axle weight detecting apparatus 2 and the sensor S is a maximum of 8 meter.

Under the items (A) to (E), typically, when the violation of the axle weight regulation is detected, the vehicle C2 two vehicles ahead of the over axle weight vehicle C1 is considered to be located on the downstream side from the axle weight detecting apparatus by 9 meter or more. Then, the vehicle C2 two vehicles ahead, is considered to be already located on the downstream side from the sensor S.

From the foregoing explanations, when the exceeding over the axle weight is detected, the over axle weight vehicle overlaps with the detection position of the sensor S, or is detected next by the sensor S, or is detected after the next.

The inventor has developed a system for detecting the over axle weight vehicle at a high probability, in accordance with the above-explained recognition. The system for detecting the over axle weight vehicle will be described below.

First Embodiment

Figure 5:
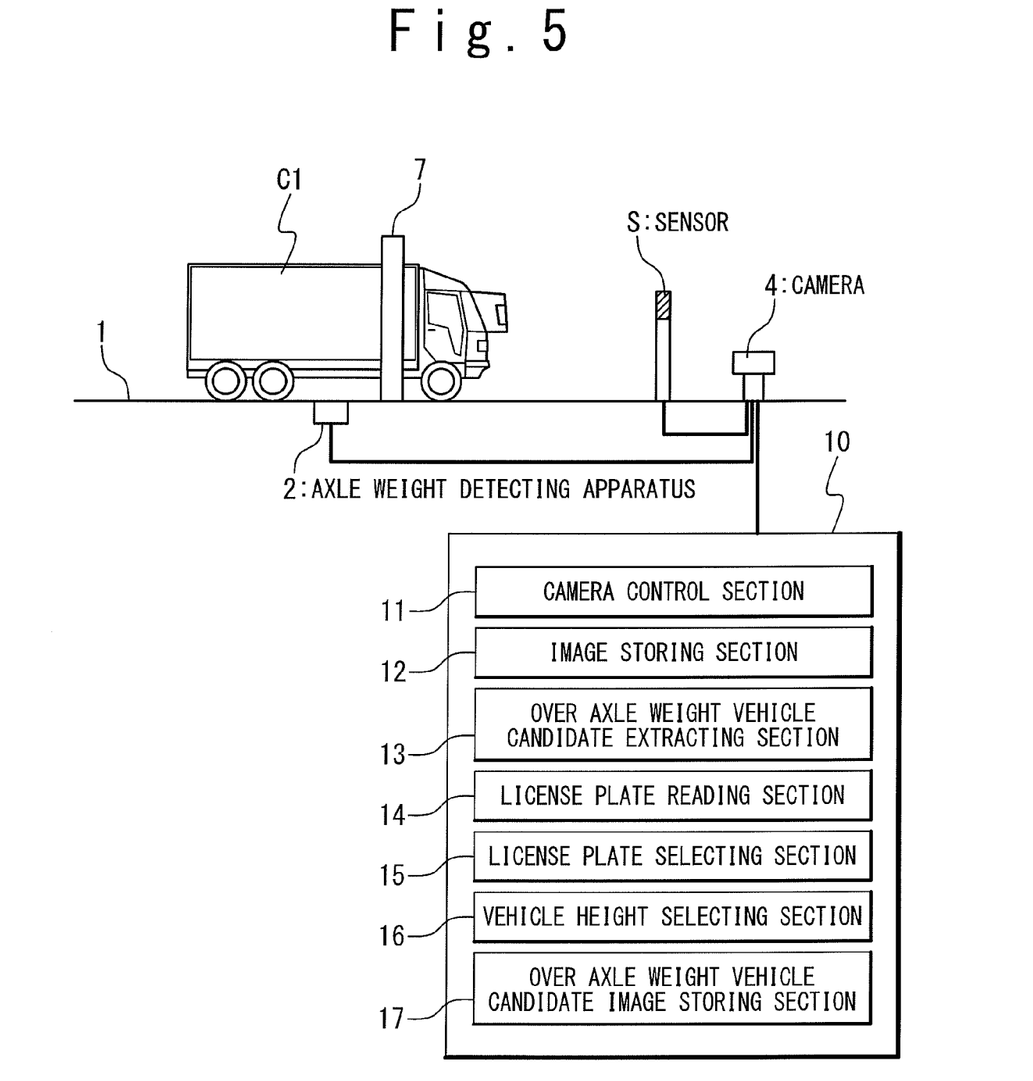
FIG. 5 shows a configuration of a system for detecting an over axle weight vehicle.

FIG. 5 shows the configuration of the system for detecting the over axle weight vehicle in a first embodiment. The system for detecting the over axle weight vehicle includes an axle weight detecting apparatus 2, a sensor S, a camera unit 4 and an over axle weight vehicle detecting apparatus 10. The sensor S is installed to detect the existence of a vehicle at the position (for example, a height of 2 meters) higher than the height of the standard-sized vehicle.

The over axle weight vehicle detecting apparatus 10 can be realized by a computer connected to the camera unit 4 so that the information can be communicated between them. The over axle weight vehicle detecting apparatus 10 includes a camera controlling section 11, an image storing section 12, an over axle weight vehicle candidate extracting section 13, a license plate reading section 14, a license plate selecting section 15, a vehicle height selecting section 16 and an over axle weight vehicle candidate image storing section 17. Each of those sections are a function block realized by a computer of the over axle weight vehicle detecting apparatus 10 which reads a computer program stored in a storage apparatus and performs a process in accordance with a procedure described in the program.

Figure 6:
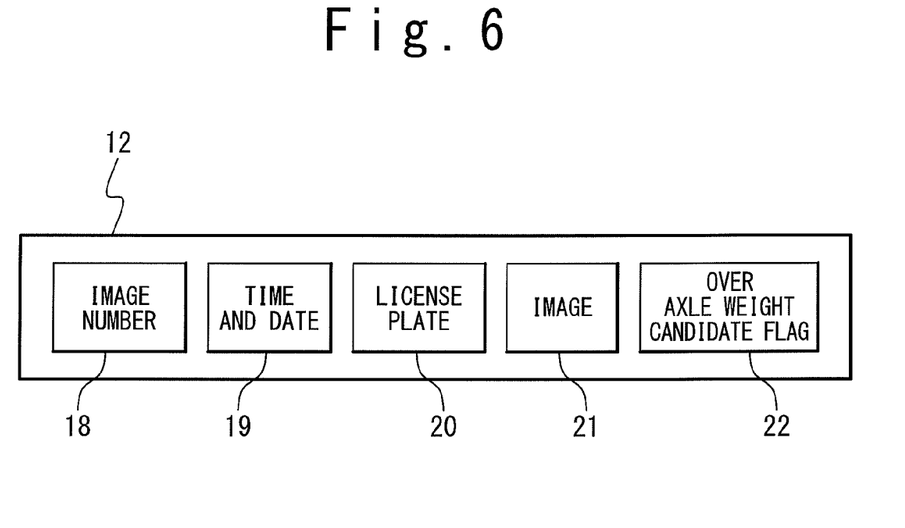
FIG. 6 shows a data configuration of information stored in an image storing section 12.

FIG. 6 shows the data configuration of the information stored in the image storing section 12. The image storing section 12 stores an image number 18, a time and date 19, a license plate 20, an image 21 and an over axle weight candidate flag 22 while they are corresponding to each other.

Figure 7:
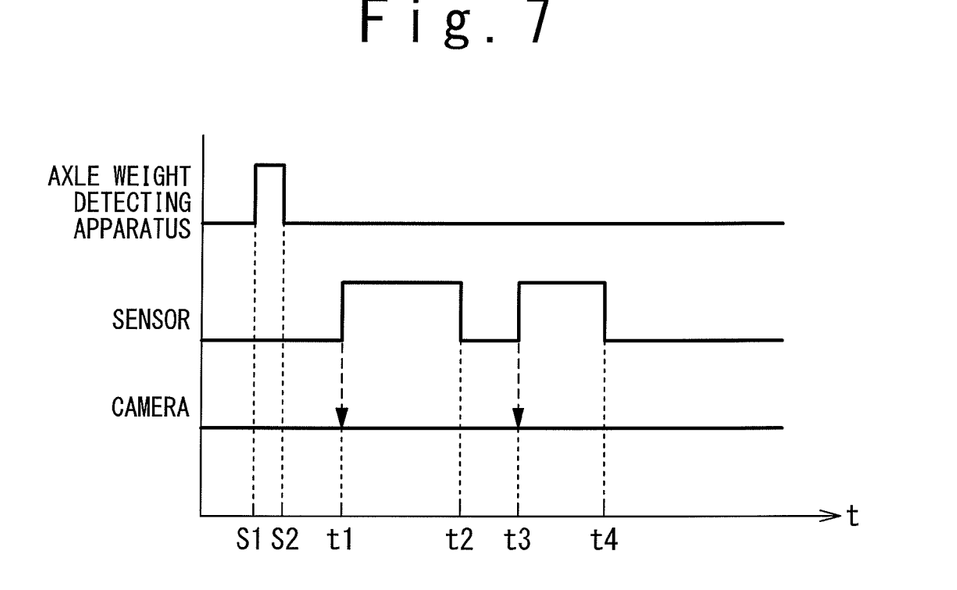
FIG. 7 is a timing chart showing an operation of the system for detecting an over axle weight vehicle.
Figure 8:
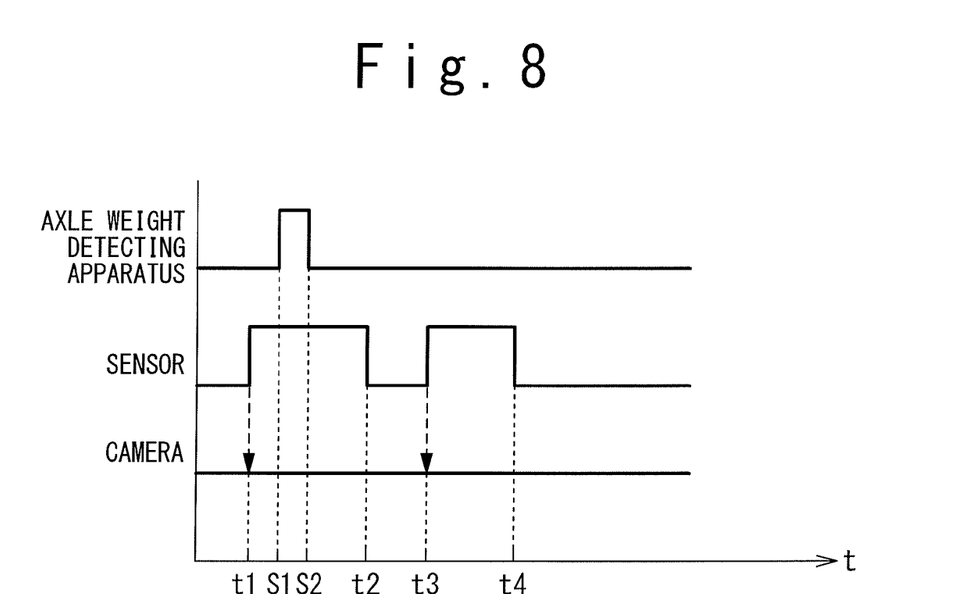
FIG. 8 is a timing chart showing an operation of the system for detecting an over axle weight vehicle.

With reference to FIGS. 7 to 12, an operations of the system for detecting the over axle weight vehicle having such configuration will be described below with classifying the cases by vehicle arrangement. FIG. 7 is a timing chart explaining an operation in the cases of the first and second patterns of the vehicle arrangement. FIG. 8 is a timing chart explaining an operation in the cases of the third and fourth patterns of the vehicle arrangement. FIGS. 9 to 12 show the first to fourth patterns in the vehicle arrangement, respectively.

With reference to FIG. 7, between times s1 and s2, the axle exceeding the maximum axle weight determined in the law passes on the axle weight detecting apparatus 2. The axle weight detecting apparatus 2 generates an over axle weight signal at the time s2 and sends the signal to the camera unit 4. The camera unit 4 is set to an over axle weight vehicle image storing mode and gets a detection signal from the sensor S. At the time s2, the detection signal indicates a vehicle flag F=0, namely, indicates that the vehicle does not exist at the detection position. In this case, from the fact explained with reference to FIG. 4, any one of the vehicle which arrives next at the detection position (the vehicle C1 in the first case shown in FIG. 9) and the vehicle which further arrives at the detection position after that (the vehicle C1 in the second case shown in FIG. 10) is considered to be the over axle weight vehicle.

When the sensor S generates the vehicle flag F=1, the camera controlling section 11 takes an image in synchronization with that timing and stores in the image storing section 12. At this time, the image number 18 to individually specify the image is issued and stored together with the current time and date 19 in the image storing section 12. Moreover, 0 is written as a corresponding over axle weight candidate flag.

The over axle weight vehicle candidate extracting section 13 extracts the vehicle which arrives next at the detection position and the next vehicle which arrives at the detection position. Specifically, to the over axle weight candidate flag 22, the value 1 is written corresponding to: the first image 21 which is taken at a time t1 when the sensor S firstly generates the vehicle flag F=1 after the time s2; and the second image 21 which is taken at a time t3 when the sensor S secondly generates the vehicle flag F=1 after the time s2.

At this time, the detection position in the vertical direction of the sensor S is set at the position higher than the vehicle height of the standard-sized vehicle. Thus, the vehicle, which is low in height, such as the typical standard-sized vehicle, is eliminated from the over axle weight vehicle candidate. At a time t4 when the sensor S generates the vehicle flag F=0 on and after the time t3, the over axle weight vehicle image storing mode of the camera unit 4 is cancelled.

The license plate reading section 14 performs an image recognition on the first image 21 and the second image 21, reads the license plate information (including the information of the kind of the size of the license plate and the symbols and characters written on the license plate) of the vehicle at the detection position, and correlates to each image 21 and then stores as the license plate 20 in the image storing section 12.

The license plate selecting section 15 eliminates the vehicle, which is judged not to be the over axle weight vehicle on the basis of the license plate 20, in accordance with a rule pre-registered in a storage unit, from the over axle weight vehicle candidate. The rule is determined, for example, as follows. In Japanese rule for the license plate, the kind of the license plate attached to the vehicle having the possibility of the violation of the axle weight regulation is determined. A large size license plate indicating that the vehicle is legally determined large size vehicle, or the "1-number" license plate whose top 1 numerical character is 1 and the "8-number" license plate whose top 1 numerical character is 8 which indicate that the vehicle is a standard size truck are attached to such a vehicle. Thus, the vehicle having a middle size license plate which is smaller than the large size license plate in which the top character of the use field code (which is numerical characters written in smaller size in Japanese license plate) is the number except 1 and 8, namely, "1-number" or "8-number" is removed from the over axle weight vehicle candidate.

The vehicle height selecting section 16 eliminates the vehicle whose vehicle height is below a predetermined value registered in a storage unit, from the over axle weight vehicle candidate, in accordance with the vehicle height measured by a vehicle height sensor (not shown in the drawings). In this embodiment, the detection position in the vertical direction of the sensor S is set at the high position at which the standard-sized vehicle is not detected. Consequently, a part of the functions of the vehicle height selecting section 16 is subrogated by the setting of the detecting position.

The over axle weight vehicle candidate image storing section 17 stores records extracted from the records stored in the image storing section 12 to the over axle weight vehicle candidate image storing section 17. The extraction is performed by eliminating images which are eliminated from the over axle weight vehicle candidate by the license plate selecting section 15 or the vehicle height selecting section 16, from the first and the second images 21 stored in the image storing section 12.

Figure 9:
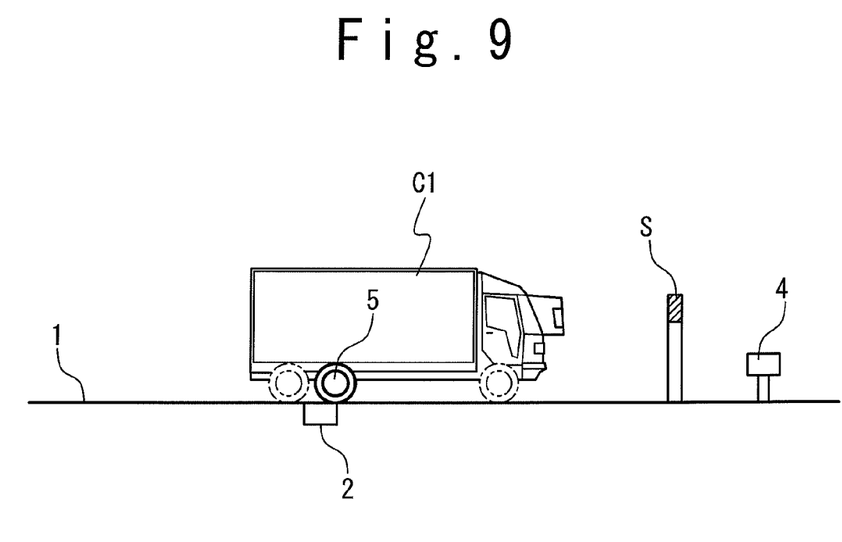
FIG. 9 shows a positional relation between a vehicle, the axle weight detecting apparatus and the sensor.
Figure 10:
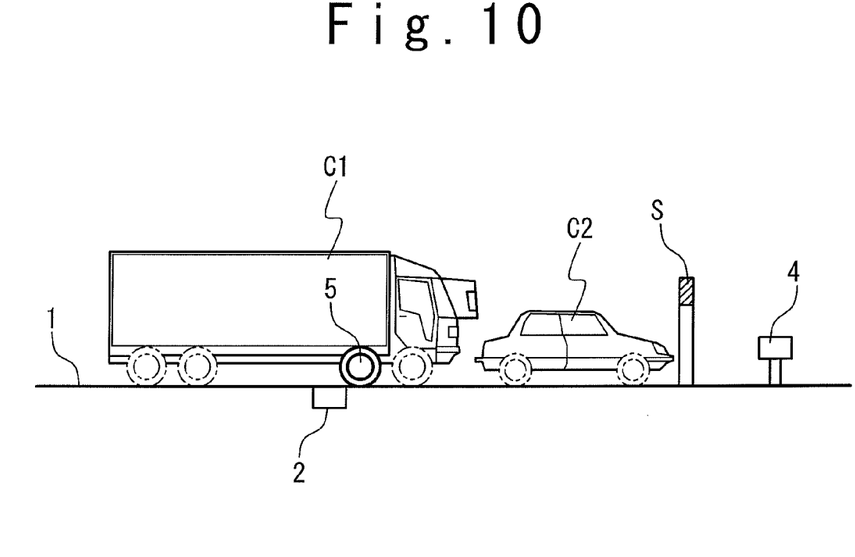
FIG. 10 shows a positional relation between a vehicle, the axle weight detecting apparatus and the sensor.

The over axle weight vehicle candidate image storing section 17 stores the image of the vehicle C1 in the first case shown in FIG. 9. In the second case shown in FIG. 10, the image of the vehicle C2 is eliminated in accordance with the image recognition of the license plate or the measured vehicle height, and the image of the vehicle C1 is stored.

Figure 11:
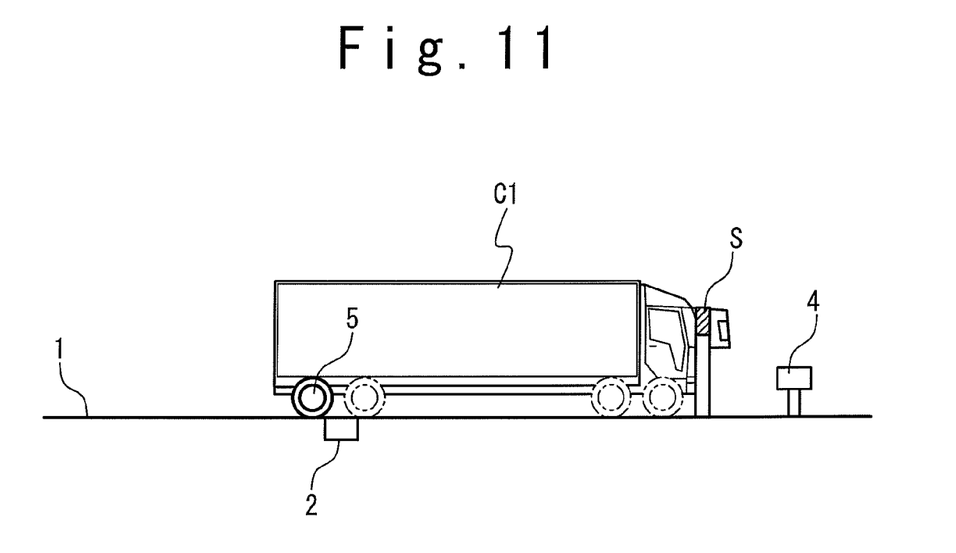
FIG. 11 shows a positional relation between a vehicle, the axle weight detecting apparatus and the sensor.
Figure 12:
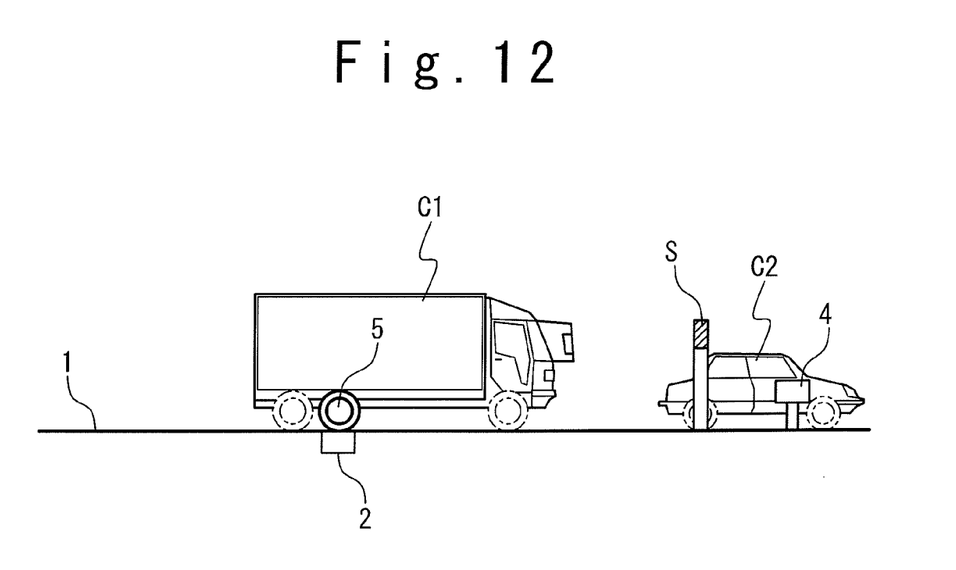
FIG. 12 shows a positional relation between a vehicle, the axle weight detecting apparatus and the sensor.

FIG. 8 is a timing chart showing an operation in the case of the vehicle arrangement shown in FIG. 11 or 12. At the start point in this timing chart, the camera unit 4 is set at a usual mode that is not the over axle weight vehicle image storing mode.

At the time t1, the sensor S detects a vehicle, generates the vehicle flag F=1 and sends the flag data to the camera unit 4. The camera controlling section 11 takes an image in synchronization with the time t1 and stores the image 21 in the image storing section 12. At this time, the image number 18 is issued and stored together with the imaged time and date 19 in the image storing section 12. Moreover, 0 is written as the corresponding over axle weight vehicle flag.

At the sensor S, the vehicle flag F=1 is maintained from the time t1 to the time t2 from when the vehicle is not detected. In the range between the times s1 and s2 included in the range between the times t1 and t2, the over weight axle 5 whose weight exceeds the regulation value of the axle weight passes on the axle weight detecting apparatus 2. The axle weight detecting apparatus 2 generates the over axle weight signal at the time s2 and sends to the camera unit 4. The camera unit 4 enters the over axle weight vehicle image storing mode and gets the detection signal from the sensor S. At the time s2, the detection signal indicates the vehicle flag F=1, namely, indicates that the vehicle exists at the detection position. In this case, any one of the vehicle currently existing at the detection position (the vehicle C1 in the third case shown in FIG. 11) and the vehicle next arriving at the detection position (the vehicle C1 in the third case shown in FIG. 11) is considered to be a possible over axle weight vehicle.

The over axle weight vehicle candidate extracting section 13 extracts the vehicle existing at the detection position and the vehicle next arriving at the detection position at the time s2.

Specifically, a value "1" is written as the over axle weight candidate flag 22, which corresponds to the third image 21 taken at the time t1 and the fourth image 21 taken at the time t3 at which the vehicle flag is firstly switched from F=0 to F=1 after the time s2.

At a time t4 at which the sensor S generates the vehicle flag F=0 after the time t3, the over axle weight vehicle image storing mode of the camera unit 4 is cancelled. Hereafter, the operation for writing the data of the over axle weight vehicle candidate selected in accordance with the vehicle height and the license plate 20, among the image which are stored in the image storing section 12 and whose over axle weight vehicle flags are 1, to the over axle weight vehicle candidate image storing section 17 is similar to the case explained with reference to FIG. 7. With the foregoing processes, the image taken from the front of the over axle weight vehicle can be recorded at a high probability.

Second Embodiment

FIGS. 13, 14, 15 and 16 show a system for detecting an over axle weight vehicle in a second embodiment of the present invention. In this embodiment, two sensors are used. Then, the logic for judging the over axle weight vehicle on the basis of the distance between the axle weight detecting apparatus and the sensor (which may be different, depending on the structure of the toll gate) is prescribed so that the over axle weight vehicle is precisely judged.

Figure 13:
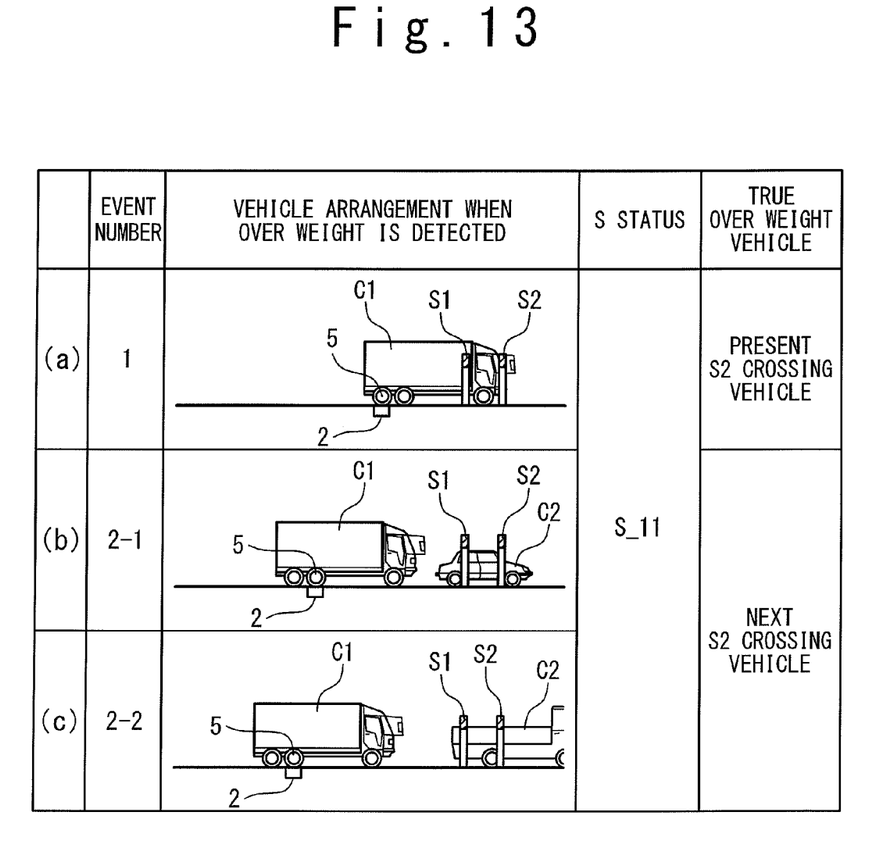
FIG. 13 shows a positional relation between a vehicle, the axle weight detecting apparatus and the sensor.

In this embodiment, a first sensor S1 and a second sensor S2 are installed at the positions corresponding to the sensor S in the first embodiment. The first sensor S1 detects the presence or absence of the vehicle at the first position in the traffic direction of the vehicle. The second sensor S2 detects the presence or absence of the vehicle at the second position that is located on a slightly downstream side of the traffic direction from the first position.

FIGS. 13 (*a*) to (*c*) show the case in which, when the axle weight detecting apparatus 2 detects the axle whose weight exceeds the regulation value, both of the first sensor S1 and the second sensor S2 detect the existence of the vehicle. This case is specified by a symbol S_11. The former in the two-digit number following S_ indicates the status of the first sensor S1, and the latter indicates the state of the second sensor S2, wherein "0" indicates the non-detection of the vehicle, and "1" indicates the detection of the vehicle. FIGS. 13 (*a*) to (*c*) indicate the patterns of the positional relations between the vehicle and the sensors in the case of S_11, respectively.

An event number 1 shown in FIG. 13 (*a*) indicates a case in which an over axle weight vehicle blocks both the beam of the first sensor S1 and the beam of the second sensor S2. An event number 2-1 shown in FIG. 13 (*b*) indicates a case in which a standard-sized vehicle (having no possibility of the violation of the axle weight regulation from the viewpoint of the vehicle type) ahead of a vehicle having over axle weight (The standard-sized vehicle may be located ahead and in adjacent to the over axle weight vehicle, or may be next adjacent to it). An event number 2-2 shown in FIG. 13 (*c*) indicates a case that a large vehicle (having the possibility of the violation of the axle weight regulation, from the viewpoint of the vehicle type) that is located ahead and adjacent to the vehicle violating the axle weight regulation blocks both the beam of the first sensor S1 and the beam of the second sensor S2.

Figure 14:
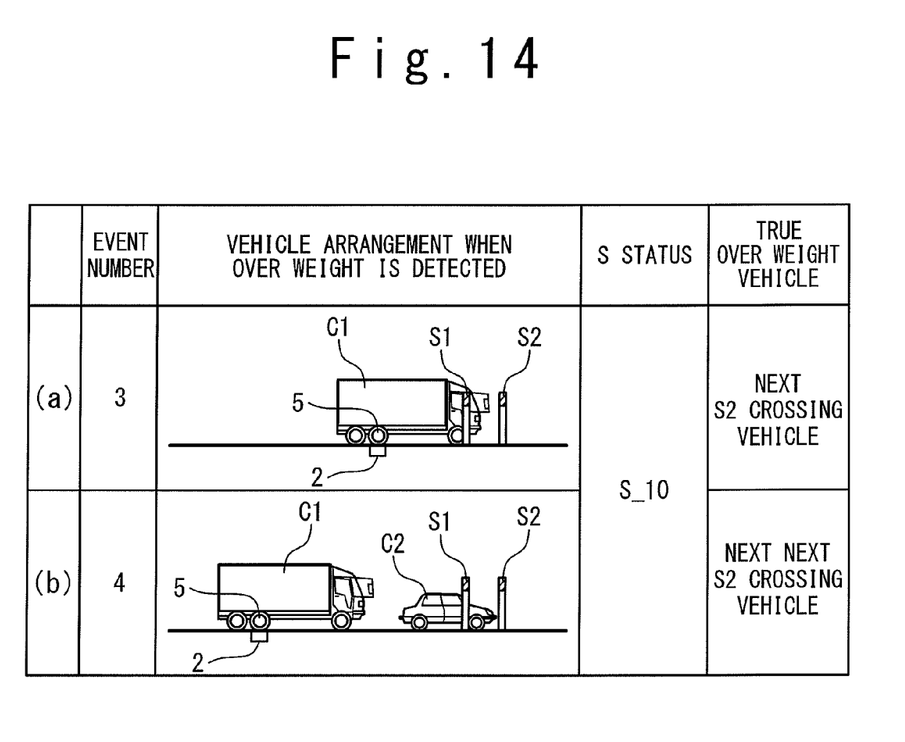
FIG. 14 shows a positional relation between a vehicle, the axle weight detecting apparatus and the sensor.

FIGS. 14 (*a*) and (*b*) show a case in which, when the axle weight detecting apparatus 2 detects the axle violating the axle weight regulation, the first sensor S1 detects the existence of a vehicle, and the second sensor S2 does not detect the existence of a vehicle. This case is specified by the symbol S_10.

An event number 3 shown in FIG. 14 (*a*) shows a case in which the vehicle violating the axle weight regulation blocks the beam of the first sensor S1, and the second sensor S2 does not detect the existence of the vehicle. An event number 4 shown in FIG. 14 (*b*) shows a case in which a vehicle ahead of the over axle weight vehicle blocks the beam of the first sensor S1, and the second sensor S2 does not detect the existence of a vehicle.

Figure 15:
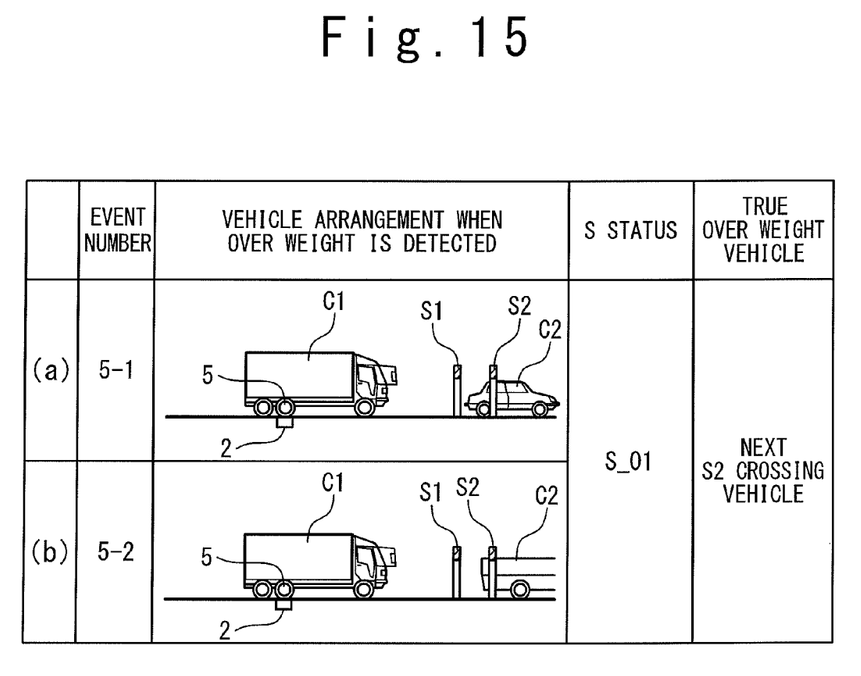
FIG. 15 shows a positional relation between a vehicle, the axle weight detecting apparatus and the sensor.

FIGS. 15 (*a*) and (*b*) show a case in which, when the axle weight detecting apparatus 2 detects the axle violating the axle weight regulation, the first sensor S1 does not detect the existence of a vehicle, and the second sensor S2 detects the existence of a vehicle. This case is specified by the symbol S_01.

An event number 5-1 shown in FIG. 15 (*a*) shows a case in which a standard-sized vehicle ahead of a vehicle violating the axle weight regulation blocks the beam of the second sensor S2, and the first sensor S1 does not detect the existence of a vehicle. An event number 5-2 shown in FIG. 15 (*b*) shows a case in which a large vehicle ahead of a vehicle violating the axle weight regulation blocks the beam of the second sensor S2, and the first sensor S1 does not detect the existence of a vehicle.

Figure 16:
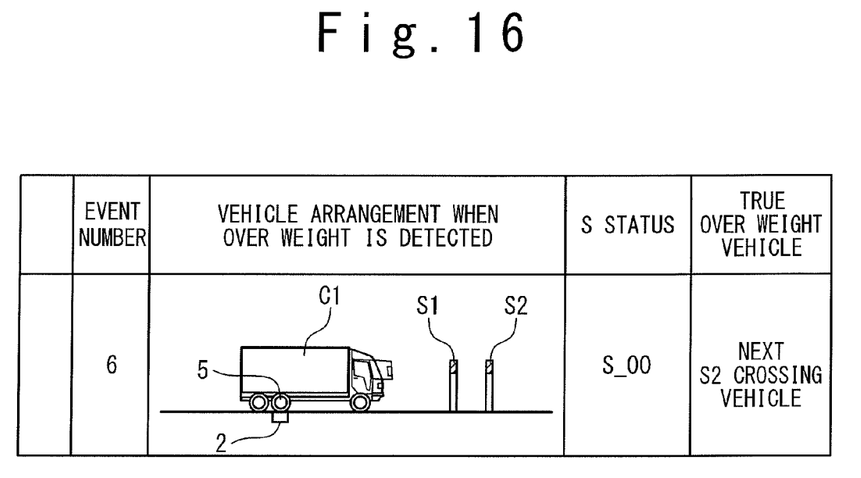
FIG. 16 shows a positional relation between a vehicle, the axle weight detecting apparatus and the sensor.

FIG. 16 shows a case in which, when the axle weight detecting apparatus 2 detects an axle violating the axle weight regulation, both the first sensor S1 and the second sensor S2 do not detect the existence of a vehicle. This case is specified by the symbol S_00.

An event number 6 shown in FIG. 16 shows a case in which a vehicle violating the axle weight regulation does not still arrive at the first sensor S1, and a different vehicle does not exist between the axle weight detecting apparatus 2 and the second sensor S2.

Figure 17:
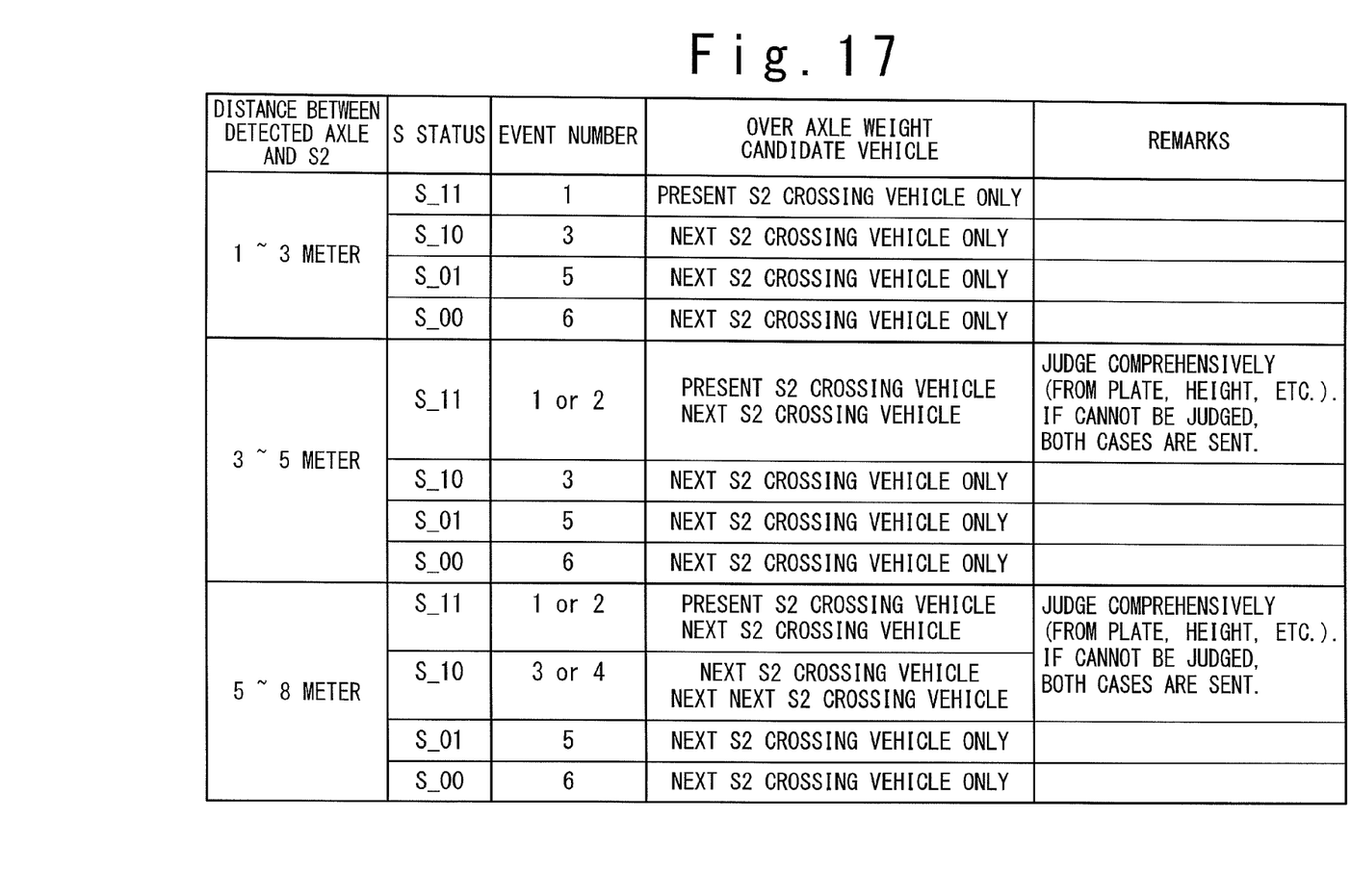
FIG. 17 is a table showing the logic to specifying the vehicle that exceeds an axle weight regulation.

FIG. 17 is a table showing the logic to specify the vehicle violating the axle weight regulation, in accordance with the statuses of the first sensor S1 and the second sensor S2. The logic is set on the basis of the distance between the axle weight detection point and the S2 (the distance between the axle weight detecting apparatus 2 and the second sensor S2) noted in the leftmost column of the table, when the system for detecting the over axle weight vehicle is installed. In this table, the event number 2 corresponds to the event numbers 2-1, 2-2 in FIG. 16, and the event number 5 corresponds to the event numbers 5-1, 5-2 in FIG. 16.

In the case in which the distance between the axle weight detection point and the S2 is between 3 m and 5 m and the status is specified by the symbol S_11, the event number can be judged to be any one of 1 and 2. However, the discrimination whether the case is 1 or 2 cannot be judged. In this case, the camera unit 4 stores the image of the vehicle violating the axle weight regulation, which corresponds to both the cases in which the event numbers are 1 and 2, as the image of the over axle weight vehicle. This is similar in the case that the distance between the axle weight detection point and the S2 is between 5 m and 8 m and the status is specified by the symbol S_11 or S_10.

The fact that the vehicle violating the axle weight regulation is filtered, in accordance with the license plate information and the vehicle height which are read by the image recognition, is similar to the first embodiment.

With the above-mentioned system, in accordance with the distance between the axle weight detecting apparatus and the sensor, a method having the highest probability can be provided collect the image of the front of the over axle weight vehicle.

This application is related to Japanese Patent Application No. 2006-326129. The disclosure of that application is incorporated herein by reference.

What is claimed is:

1. An over axle weight vehicle detecting system comprising:
   an axle weight detecting section configured to detect a weight of an axle of a vehicle at a first position on a lane for generating an over axle weight signal;
   a sensor configured to detect a vehicle at a second position set within 8 meters downstream side of the first position to generate a detection signal;
   a camera unit configured to take an image of a vehicle in response to the detection signal; and
   an over axle weight vehicle candidate extracting section configured to choose a first vehicle and a second vehicle as candidates of an over axle weight vehicle violating an axle weight regulation when the axle weight exceeds a predetermined value, wherein
   the first vehicle comprises one of a vehicle currently being detected by the sensor if the over axle weight signal is generated after the detection signal, and a vehicle next detected by the sensor if the over axle weight signal is generated before the detection signal; and
   the second vehicle comprises a vehicle detected by the sensor immediately after the first vehicle.

2. The over axle weight vehicle detecting system according to claim 1, further comprising an imaging storing section configured to store the image taken by the camera, the image storing section comprising an over axle weight candidate flag.

3. The over axle weight vehicle detecting system according to claim 1, wherein the camera unit takes an image of a front side of a vehicle.

4. The over axle weight vehicle detecting system according to claim 1, further comprising:
   a license plate selecting section configured to eliminate a vehicle which is not violate the axle weight regulation from the candidates of the over axle weight vehicle based on information of a license plate read from an image taken by the camera unit.

5. The over axle weight vehicle detecting system according to claim 1, further comprising:
   vehicle height sensor configured to detect a height of a vehicle,
   wherein a vehicle whose height detected by the vehicle height sensor is below a predetermined value is eliminated from the candidate of the over axle weight vehicle.

* * * * *